J. O. LUTHY.
SEPARATOR FOR STORAGE BATTERY PLATES.
APPLICATION FILED SEPT. 15, 1919.
1,339,853.
Patented May 11, 1920.
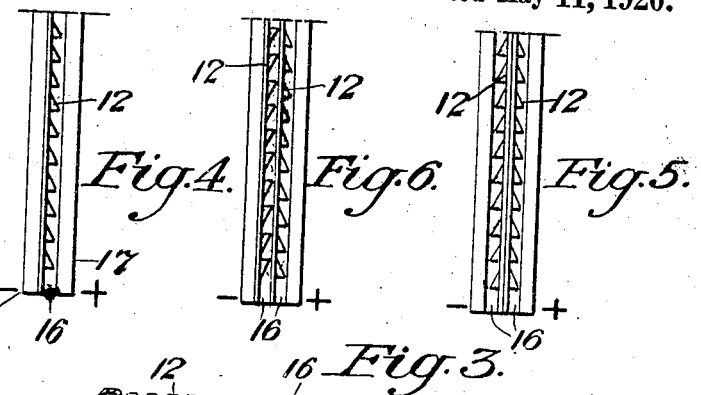
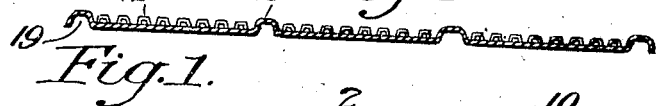
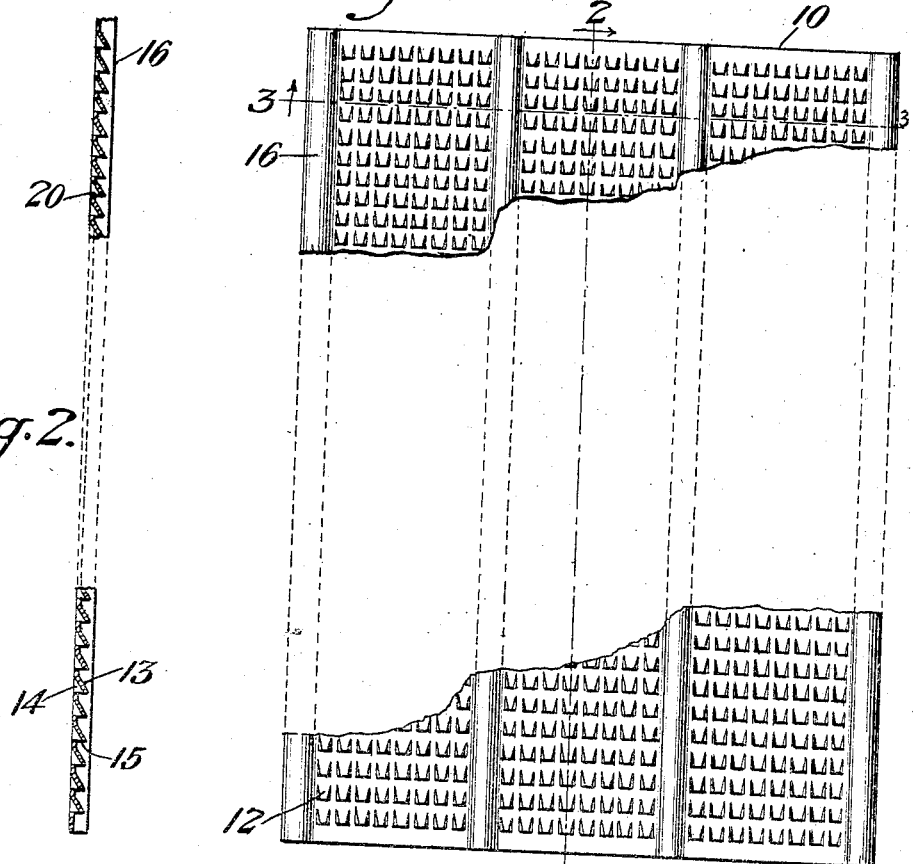
Inventor.
Joseph O. Luthy,
by Chas. J. O'Neill
atty.

UNITED STATES PATENT OFFICE.

JOSEPH O. LUTHY, OF SAN ANTONIO, TEXAS.

SEPARATOR FOR STORAGE-BATTERY PLATES.

1,339,853.  Specification of Letters Patent.  Patented May 11, 1920.

Application filed September 15, 1919. Serial No. 323,876.

*To all whom it may concern:*

Be it known that I, JOSEPH O. LUTHY, a citizen of the Republic of Switzerland, residing at San Antonio, in the county of Bexar and State of Texas, have invented certain new and useful Improvements in Separators for Storage-Battery Plates; and I do hereby declare the following to be a full, clear, and exact description of the invention, such as will enable others skilled in the art to which it appertains to make and use the same.

In storage batteries it is essential that movement of the electrolyte from one plate to the other be permitted. It is, however, important that the separator for the plates be so constructed that the collection of the free active material on the same will be prevented in order to obviate the increase of the internal resistance and the short-circuiting of the cell.

The separator which forms the subject matter of this application, is so constructed that the fluid will be permitted to flow freely from one plate to the other and yet the free active material which falls from one of the plates will be thrown to the bottom of the cell and thus prevented from increasing the internal resistance or short circuiting the cell by accumulating between the separator and the plate.

In the drawings:

Figure 1 is an elevation of one of the separator elements;

Fig. 2 is an enlarged fragmental sectional view;

Fig. 3 is a sectional view taken at right angles to Fig. 2;

Fig. 4 is a fragmental view showing one separator element in place between two battery plates;

Fig. 5 is a similar view showing two of the separator elements between adjacent battery plates; and Fig. 6 is a similar view of a different arrangement of the two separator elements.

Each separator element is made of celluloid or some similar electrolyte resisting material and is of suitable contour for insertion between the plates of a storage battery. The element 10 illustrated in the drawing is rectangular and is provided with a plurality of horizontally and vertically disposed rows of perforations. These perforations are formed by pressing or otherwise forming hood-like members 12 which protrude from one side of the element 10. These hood-like members are formed with an inclined wall 13 and side walls 14 and they are open at 15. These openings 15 extend at right angles or substantially at right angles to the body of the separator so that the electrolyte must necessarily change its direction of flow to pass from one battery plate to the other.

The separator elements are also provided with vertically disposed ribs 16 which are preferably pressed in the element, but which may be otherwise formed if desired. These ribs extend a greater distance from the plane of the body of the separator element than the hood-like members 12 so that they contact with the plates of the battery to space the flanges therefrom.

These separator elements may be used in several different manners. In Fig. 4 I have illustrated the use of a single plate between two battery plates 17 and 18. With this arrangement this element is disposed between the battery plates with the hood-like members extending toward the positive plate and the flat side of the element against the negative plate. The inclined walls 13 of the hood-like members are inclined downwardly and away from the body of the element, so that the openings 15 face downwardly. This arrangement will permit the free flow of the fluid and yet will prevent the passage of the free active material from one plate to the other. Furthermore, the growing and expansion of the free active material will be permitted without increasing the internal resistance, because of the presence of the grooves 19 which result from the formation of the ribs and the pockets 20 which result from the formation of the hood-like members.

In Fig. 5 I have illustrated the use of two separator elements, in which arrangement the smoother portions of the elements are placed together and the hood-like members extend toward the plates of the battery. The ribs act to space the elements from the battery plates.

In Fig. 6 a somewhat different arrangement is shown. Here the hood-like members of one separator element extend toward the positive plate, while the hood-like members of the second separator element extend toward the first element, the first element being spaced from the positive plate and the second element from the first by the ribs. The flat face of the second element is arranged in contact with the negative battery plate.

What I claim is:—

1. A separator for secondary battery plates comprising a plate having a series of openings there-through and a series of protruding members over-hanging and closing the openings on all sides but one.

2. A separator for secondary battery plates comprising a plate having a series of protruding hood-like members, one edge of each of which is cut away to form an opening through the plate.

3. A separator for secondary battery plates comprising a plate having a series of protruding hood-like members, the lower edge of each of which is cut away to form an opening through the plate.

4. A separator for secondary battery plates comprising a sheet of material having openings extending there-through each of said openings being defined by a hood-like member surrounding the opening and united to the sheet on three sides of the opening.

5. A separator for secondary battery plates comprising a plate having a series of openings therethrough, a series of protruding hood-like members over-hanging said openings, and ribs extending across the face of said plate and projecting therefrom to a greater extent than the hood-like members.

In testimony whereof I affix my signature.

JOSEPH O. LUTHY.